United States Patent [19]

Oddenino

[11] Patent Number: 4,712,703

[45] Date of Patent: Dec. 15, 1987

[54] PERFECTED CAP, PARTICULARLY FOR MOTOR VEHICLES

[75] Inventor: Manrico Oddenino, Via Reano, Italy

[73] Assignee: Illinois Tool Works Inc., Chicago, Ill.

[21] Appl. No.: 861,719

[22] Filed: May 12, 1986

[30] Foreign Application Priority Data

May 21, 1985 [IT] Italy .................... 53410/85[U]

[51] Int. Cl.[4] .......................................... B65D 55/14
[52] U.S. Cl. ........................ 220/210; 220/DIG. 33
[58] Field of Search ............... 220/210, DIG. 33; 70/165

[56] References Cited

U.S. PATENT DOCUMENTS

| 4,107,961 | 8/1978 | Evans | 220/210 X |
| 4,231,240 | 11/1980 | Fujita | 220/210 X |
| 4,299,102 | 11/1981 | Aro | 220/210 X |
| 4,342,208 | 8/1982 | Evans | 220/210 X |
| 4,485,647 | 12/1984 | Matthews | 220/210 X |

FOREIGN PATENT DOCUMENTS

| 471067 | 2/1929 | Fed. Rep. of Germany | 220/210 |
| 1134303 | 8/1962 | Fed. Rep. of Germany | 220/210 |

Primary Examiner—Steven M. Pollard
Attorney, Agent, or Firm—John P. O'Brien; Thomas W. Buckman

[57] ABSTRACT

A vehicle fuel tank cap designed to be secured idly in the closed position by activating a lock. The cap presents an outer member which may be turned manually by the user, an inner member housed idly inside the outer member and designed to screw onto a filler, and a control member carried in idle and axially-locked manner on the inner member and secured angularly integral with the lock. The control member is secured, by means of a reversible threaded coupling, to the outer member which is designed to move axially in relation to the inner member and is provided with a saw-tooth ring gear designed to mesh with a corresponding ring gear on a flexible portion of the inner member.

2 Claims, 2 Drawing Figures

PERFECTED CAP, PARTICULARLY FOR MOTOR VEHICLES

BACKGROUND OF THE INVENTION

The present invention relates to a perfected cap, particularly for a vehicle fuel tank, having a safety lock and a controlled torquing device.

Safety caps for vehicle fuel tanks are known to consist usually of two members mounted idly one inside the other and securable in angularly integral mannery by means of a key-operated lock. The outermost member is fitted with the lock and operated manually by the user, whereas the innermost member is threaded, so as to screw onto the filler. A drawback on caps of the aforementioned type is that they in no way enable the adoption of controlled torquing devices, due to the total mechanical and dimensional incompatibility of known controlled-torque mechanisms and known mechanisms for securing the outer member onto the inner member. Consequently, if not fitted correctly, known safety caps may easily be screwed too firmly or too loosely onto the filler, thus resulting in poor locking of the tank and/or damage to the filler.

SUMMARY OF THE INVENTION

The aim of the present invention is to provide a safety cap of the aforementioned type, particularly suitable for use on motor vehicles and involving none of the aforementioned drawbacks; in particular, a cap providing for both controlled torquing, if required, and idle safety locking of the outer part of the cap, so as to prevent forcing of the same.

With this aim in view, according to the present invention, there is provided a cap, particularly for a vehicle fuel tank, comprising an outer member designed to be gripped and turned manually by the user, a threaded inner member housed idly inside the said outer member and designed to screw in fluidtight manner onto a filler, and a lock carried in idle manner on the outer member and operated by means of a key for rendering the said outer and the said inner members mutually integral, characterised by the fact that it also comprises a control member carried in idle and axially-locked manner on the said inner member and connected angularly integral with the said lock in such a manner as to be turned subsequent to operation of the said lock; the said control member cooperating with the said outer member via respective face-to-face, inclined, helical surfaces, and the said outer member, which is designed to move axially in relation to the said inner member, being provided internally with front teeth designed to engage with corresponding front teeth on the said inner member.

BRIEF DESCRIPTION OF THE DRAWINGS

The present invention will be described by way of example with reference to the accompanying drawing in which.

DETAILED DESCRIPTION OF THE INVENTION

Figure 1:
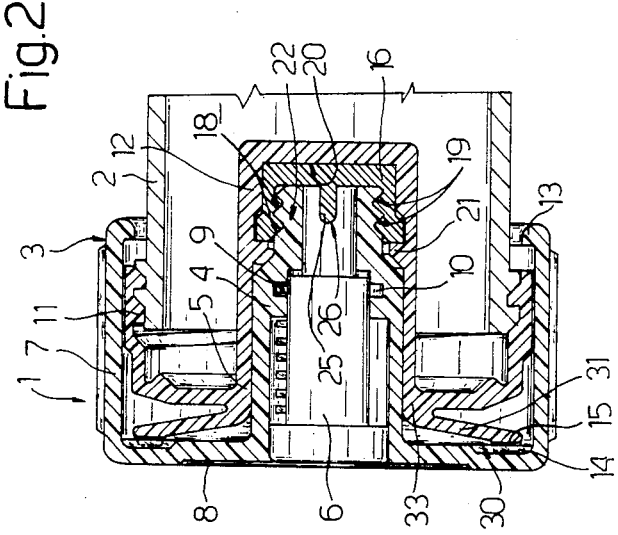
FIG. 1 shows a partially-sectioned outer side view of a cap according to the teachings of the present invention.
Figure 2:
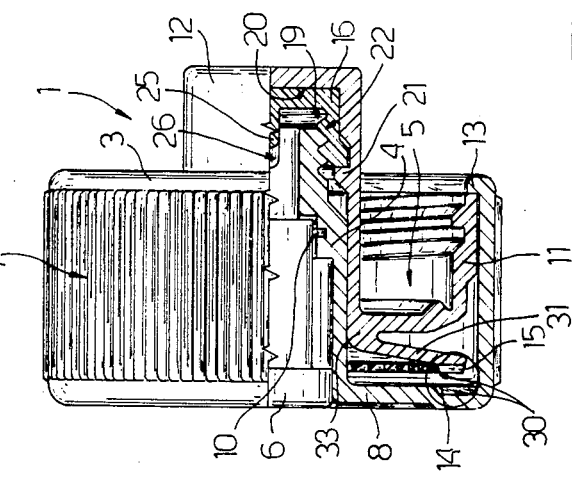
FIG. 2 shows a section of the FIG. 1 cap as mounted.
Figure 1A:
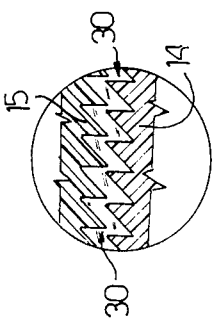

Number 1 in FIGS. 1 and 2 indicates a safety cap, particularly suitable for a filler 2, for example, on a known type of fuel tank (not shown), for example, on any known type of vehicle (not shown). Cap 1 comprises a cup-shaped substantially known type of outer member 3 having a hollow centre shank 4; a threaded inner member 5 carried in idle manner on member 3 and designed to screw in fluidtight manner onto filler 2; and a known type of lock 6 operated by means of a known type of key (not shown) for rendering members 3 and 5 mutually integral as described later on. Member 3 comprises a cylindrical side wall 7, preferably knurled for enabling the said member 3 to be gripped and turned manually by the user, and an end wall 8 integral with hollow shank 4. The said hollow shank 4 is open towards wall 8 and, in accordance with the present invention, houses, in idle manner, lock 6 which is locked axially inside shank 4 by a hook 9 designed to click into an annular groove 10 inside shank 4. Member 5 is shaped similar to member 3 and comprises an internally-threaded cup-shaped body 11 designed to screw onto filler 2, the said body 11 being smaller in size than member 3 and housed loosely inside the same; and a hollow cylindrical shank 12 open at its root end and fitted idly onto shank 4. Member 5 is designed to click inside member 3, is held inside the same by means of shoulder edge 13, and is axially and relatively mobile, in relation to member 3, between two limit positions illustrated respectively in FIGS. 1 and 2. In the first of the said positions (FIG. 1), member 5 is located against shoulder 13, and in the second (FIG. 2), member 5 abuts with wall 8 at a sufficient given distance from shoulder 13 to ensure mutual meshing of two respective sets of front teeth, 14 and 15, integral with the inside of member 3 and with member 5 respectively and designed to engage mutually for rendering members 3 and 5 angularly integral with each other.

In accordance with the present invention, relative axial movement of members 3 and 5 between the said two limit positions is controlled by a control member 16 carried in idle and axially-locked manner on member 5 and connected angularly integral with lock 6, in such manner as to turn, together with lock 6, when the said lock 6 is operated. Member 16, in fact, cooperates with outer member 3 via respective inclined, face-to-face, helical surfaces 18 and 19 on members 3 and 16 respectively, said surfaces 18 and 19 determining relative axial traversing of member 3 in relation to member 16 subsequent to rotation of control member 16. In more detail, member 16 is made of plastic, is designed to click idly inside a seat 20 formed in shank 12, in which seat 20 member 16 is retained axially locked by a shoulder 21, and is secured to shank 4 of member 3 by means of a reversible threaded coupling 22, the respective threads of which define surfaces 18 and 19. Member 16 is preferably cup-shaped, is threaded internally in such a manner as to receive the threaded end of shank 4, and is angularly connected to lock 6 by means of an internal transverse tab 25 engaged in a corresponding transverse groove 26 on lock 6, thus enabling rotation of member 16 by lock 6 without impeding relative axial movement of lock 6 integral with member 3.

For controlled torquing of cap 1, teeth 15 and 16 are formed, as shown in the embodiment in FIGS. 1 and 2, by means of two respective saw-tooth ring gears, teeth 15 on member 5 being carried on a flexible projecting portion 31 projecting frontwards of the front end 33 of member 5 and of substantially truncated-cone shape.

Operation of cap 1 as described is as follows. When members 3 and 5 are arranged as shown in FIG. 2, with portion 31 abutting with end wall 8, teeth 14 and 15 mesh so as to render members 3 and 5 angularly integral, thus enabling the user to screw cap 1 onto or off filler 2 for closing or opening the same. Any rotation imparted manually on member 3 via wall 7 is transmitted to the underlying member 5, thus resulting in the said member 5 being screwed onto or off filler 2. What is more, if teeth 14 and 15 are formed by means of sawtooth ring gears 30, obviously, the said ring gears need simply be formed with the oblique tooth portion facing the direction wherein member 3 is screwed onto filler 2, for ensuring controlled torquing of cap 1. If such is the case, the torques exchanged between teeth 14 and 15 produce axial strain on member 5, which strain, in turn, produces flexural strain on flexible projecting portion 31. When the said axial strain exceeds the rigidity of portion 31, which may be determined as required during manufacture of cap 1 by appropriately varying the thickness of portion 31, the said portion 31 flexes towards end 33, thus resulting in partial withdrawal of teeth 15 from teeth 14 and, consequently, mutual sliding of members 3 and 5 and non-transmission of the torque between the same. Therefore, once cap 1 has been fully screwed on, any attempt to screw it on further, by virtue of the increased resistance involved, causes members 3 and 5 to slide mutually, thus locking cap 1 in the axial position reached at that point, and preventing any possibility of cap 1 being forced and so damaging filler 2. Non-sliding of members 3 and 5, on the other hand, is an indication to the user that cap 1 has not been screwed on firmly and must therefore be screwed further onto filler 2. Once cap 1 has been screwed right down, it may be locked up for safety by operating lock 6, in known manner, using a combination key (not shown). By means of the said key, lock 6 is turned so as to turn member 16, the tab 25 of which is forced inside groove 26. Rotation of the said member 16 causes shank 4 to screw off member 16, thus causing member 3 to traverse in relation to member 5, and teeth 14 and 15 to move away into the limit position sown in FIG. 1, wherein edge 13 abuts with body 11. In such a position, teeth 14 and 15 are disengaged, thus preventing cap 1 from being removed from filler 2, in that any rotation of member 3 is not transmitted to member 5. Once the key is removed from lock 6, cap 1 is therefore theftproof and may only be removed by operating lock 6 in reverse, in such a manner as to screw shank 4 into member 16 and re-engage teeth 14 and 15.

The advantages of the cap in accordance with the present invention will be clear from the foregoing description. In addition to being reliable and compact, it is also cheap and easy to manufacture and assemble. What is more, the cap in accordance with the present invention provides for controlled torquing without sacrificing the safety locking function preventing removal of the cap when locked.

To those skilled in the art it will be clear that changes may be made to the cap as described herein without, however, departing from the scope of the present invention.

I claim:

1. A locking safety cap for a threaded filler neck comprising:

an outer shell member having a cup-shaped portion and an integral hollow shank portion, said cup-shaped portion having a circular base section and an integral annular flange section, said hollow shank portion having exterior threads on its outer end, an inner closure member rotatably slidingly retained within said outer cap member and having threads to engage and close said filler neck, said closure member having a hollow cylindrical sleeve portion slidably disposed over the outer end of said hollow shank portion of said outer shell member, a cylindrical shaped control member rotatably slidably retained within said hollow cylindrical sleeve portion of said inner closure member and having internal threads in threaded engagement with said exterior threads on the outer end of said hollow shank portion of said outer sleeve member, where said control member allows said outer shell member to be moved axially relative to said inner closure member between a locked and an unlocked portions, lock means mounted inside said hollow shank portion of said outer shell member for selectively interlocking said control member in a manner that turning said lock means causes said outer shell member to move from said locked position to said unlocked position, a first saw-tooth ring gear half being formed on the inside surface of said circular base section of said cup-shaped portion of said outer shell member and a second saw-tooth ring gear half flexably supported by said cylindrical sleeve portion of said inner closure member in a manner to be in a mating relationship with said first sawtooth gear half whenever said outer shell member is in said locked position and disengaged whenever said outer shell member is in said unlocked position.

2. A locking safety cap as defined in claim 1, wherein said inner closure member is constructed of molded plastic material and said second saw-tooth ring gear half is integrally interconnected to the open-end of said cylindrical sleeve portion of said inner closure member by a flexible truncated cone-shaped plastic molded structure.

* * * * *